United States Patent
Lindegren et al.

(10) Patent No.: US 9,203,708 B2
(45) Date of Patent: Dec. 1, 2015

(54) ESTIMATING USER-PERCEIVED QUALITY OF AN ENCODED STREAM

(75) Inventors: David Lindegren, Luleå (SE); Richard Tano, Umeå (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 265 days.

(21) Appl. No.: 13/388,818

(22) PCT Filed: Jan. 16, 2012

(86) PCT No.: PCT/SE2012/050031
§ 371 (c)(1),
(2), (4) Date: Feb. 3, 2012

(87) PCT Pub. No.: WO2013/048300
PCT Pub. Date: Apr. 4, 2013

(65) Prior Publication Data
US 2013/0081071 A1    Mar. 28, 2013

Related U.S. Application Data

(60) Provisional application No. 61/539,124, filed on Sep. 26, 2011.

(51) Int. Cl.
*H04N 21/647* (2011.01)
*H04L 29/06* (2006.01)
(Continued)

(52) U.S. Cl.
CPC ............ *H04L 41/5067* (2013.01); *H04L 65/80* (2013.01); *H04N 17/004* (2013.01); *H04N 21/647* (2013.01)

(58) Field of Classification Search
CPC . H04N 21/647; H04N 21/434; H04N 17/004; H04N 17/04; H04L 65/80; H04L 41/5067
See application file for complete search history.

(56) References Cited

U.S. PATENT DOCUMENTS 6,011,868 A * 1/2000 van den Branden et al. . 382/233
6,285,797 B1    9/2001 Lubin et al.
(Continued)

FOREIGN PATENT DOCUMENTS

EP    1804519 A1    7/2007
EP    2077672 A1    7/2009
(Continued)

*Primary Examiner* — Pinkal R Chokshi
(74) *Attorney, Agent, or Firm* — Patent Portfolio Builders, PLLC

(57) ABSTRACT

One or more embodiments herein dynamically and objectively estimate user-perceived quality of an encoded video stream in dependence on the underlying video content of that stream. Estimation processing according to these embodiments includes generating a chronological sequence of the absolute or relative sizes of encoded video frames in the stream. Processing further entails analyzing this sequence to identify a plurality of reference characteristics that are defined in a reference model. These reference characteristics are more specifically defined in the reference model as parameters that characterize or are otherwise associated with content-dependent variations in user-perceived quality. For example, the reference characteristics in some embodiments comprise reference patterns or reference statistical measures that have been determined based on analyzing frame size sequences generated for reference video streams with known qualities. Regardless, processing finally includes estimating the user-perceived quality of the stream based on the identified reference characteristics, according to the reference model.

24 Claims, 8 Drawing Sheets

(51) Int. Cl.
*H04L 12/24* (2006.01)
*H04N 17/00* (2006.01)

(56) References Cited

U.S. PATENT DOCUMENTS

| | | | |
|---|---|---|---|
| 8,396,323 B2* | 3/2013 | Huynh-Thu et al. | 382/275 |
| 2004/0012675 A1* | 1/2004 | Caviedes | 348/180 |
| 2007/0133608 A1* | 6/2007 | Isambart et al. | 370/484 |
| 2009/0273676 A1* | 11/2009 | Huynh-Thu et al. | 348/180 |
| 2010/0110199 A1 | 5/2010 | Winkler et al. | |
| 2010/0125871 A1* | 5/2010 | Liao et al. | 725/34 |
| 2010/0265334 A1 | 10/2010 | Bhaskaran et al. | |
| 2011/0176060 A1* | 7/2011 | Lee et al. | 348/723 |
| 2011/0222669 A1 | 9/2011 | Buriano et al. | |
| 2012/0099793 A1* | 4/2012 | Kumar et al. | 382/190 |
| 2013/0016770 A1* | 1/2013 | Kishigami et al. | 375/240.02 |
| 2013/0044224 A1* | 2/2013 | Liao et al. | 348/192 |
| 2013/0057705 A1* | 3/2013 | Parker et al. | 348/184 |
| 2013/0111538 A1* | 5/2013 | Endo et al. | 725/116 |
| 2013/0208814 A1* | 8/2013 | Argyropoulos et al. | 375/240.27 |
| 2013/0265445 A1* | 10/2013 | Argyropoulos et al. | 348/192 |

FOREIGN PATENT DOCUMENTS

| | | |
|---|---|---|
| EP | 2252073 A1 | 11/2010 |
| EP | 2493205 A1 | 8/2012 |
| WO | 2004008780 A1 | 1/2004 |
| WO | 2011048829 A1 | 4/2011 |
| WO | 2011082719 A1 | 7/2011 |
| WO | 2011134113 A1 | 11/2011 |

* cited by examiner

ESTIMATING USER-PERCEIVED QUALITY OF AN ENCODED STREAM

RELATED APPLICATIONS

This application claims priority from U.S. Provisional Patent Application Ser. No. 61/539,124, which was filed on 26 Sep. 2011 and was entitled "Video Encoding Complexity Estimation by using Transport Information."

TECHNICAL FIELD

The present invention generally relates to objectively estimating the quality of an encoded video stream, as perceived by a user, and particularly relates to estimating such quality in dependence on the video content of that stream.

BACKGROUND

The quality of a service from the perspective of a user consuming that service functions as an important measure of the service's end-to-end performance. This proves particularly true for services like video streaming (e.g., IPTV) that rely on a delivery network for transport, because poor delivery network performance greatly affects the video streaming quality perceived by the user. Armed with information about user-perceived quality (also known as quality of user experience), a network operator can better plan for future network development, monitor user satisfaction, make adjustments to network processing and/or storage resources, make adjustments to video stream encoding, and the like.

One common approach to measuring user-perceived quality of a video stream entails directly surveying users regarding their subjective opinion about that quality. For example, users may be asked to rate the quality of a video stream on a predefined scale (e.g., from 1 to 5) for different video stream bitrates. The average of these subjective ratings for a given bitrate represents the Mean Opinion Score (MOS) for that bitrate. Of course, subjective approaches like this require large human resources and are quite time-consuming, which prevents the approaches from being used dynamically for real-time applications like quality monitoring.

Other approaches can be implemented dynamically because they estimate the user-perceived quality of a video stream based on objective criteria, rather than based on the subjective opinions of users. One objective approach, for example, directly evaluates decoded video frames of a stream for certain characteristics that are modeled as being associated with user-perceived quality. Such characteristics may be the degree of motion present in the decoded video frames (e.g., jerkiness), the degree of detail present in the decoded video frames (e.g., blockiness or blurriness), and other visual artifacts present in the decoded video frames. While this objective approach proves advantageous for a number of reasons, one serious drawback to the approach remains that it cannot be used if the video stream payload is encrypted.

Another objective approach addresses this problem of encryption by evaluating parameters contained within one or more packet-layer headers that encapsulate the video stream payload, rather than evaluating the video stream payload itself. These packet-layer parameters may describe, for instance, the codec, format, frame rate, and bitrate of the video stream and may be contained within any number of packet layers (e.g., from the IP layer through the RTP layer and the MPEG2-TS layer).

Notably, however, none of the packet-layer parameters directly describe the underlying video content of the video stream, e.g., in terms of whether the video content relates to fast moving content (such as a hockey game) or to slow moving content (such as a newscast). Because of this, known packet-layer objective approaches fail to adequately account for the affect that the underlying video content of a video stream has on the user-perceived quality of that stream. Indeed, such known approaches may estimate that different video streams have the same user-perceived quality for a given bitrate, even though the streams in fact have very different qualities (e.g., on the order of several MOS values) because they relate to very different video content. Such inaccurate estimation of user-perceived quality ultimately degrades that quality, since any network adjustments made based on that estimation may be less effective in improving end-to-end performance.

SUMMARY

One or more embodiments herein dynamically and objectively estimate user-perceived quality of an encoded video stream in dependence on the underlying video content of that stream. But rather than necessarily evaluating the underlying video content directly (e.g., after decoding the stream's video frames), the embodiments estimate the user-perceived quality based on analyzing a chronological sequence of the absolute or relative sizes of the stream's encoded video frames. Notably, this sequence may be generated from an inspection of one or more packet-layer parameters. This means that user-perceived quality may be estimated based on a stream's underlying video content and thereby improve the accuracy of the quality estimate (as compared to estimates not based on video content), even if the video stream payload is encrypted.

More specifically, embodiments herein include a method for objectively estimating user-perceived quality of an encoded video stream. Processing according to this method includes generating a chronological sequence of the absolute or relative sizes of encoded video frames in the stream. For convenience, this sequence may be referred to herein simply as a frame size sequence. Processing according to the method then entails analyzing this sequence to identify a plurality of reference characteristics that are defined in a reference model. These reference characteristics are more specifically defined in the reference model as parameters that characterize or are otherwise associated with content-dependent variations in user-perceived quality. Processing of the method finally includes estimating the user-perceived quality of the stream based on the identified reference characteristics, according to the reference model.

In one or more embodiments, the reference characteristics that serve as parameters in the reference model comprise reference patterns. In this case, the reference model defines different categories of frame size sequences as being characterized by different sets of reference patterns and as being associated with different ranges of user-perceived qualities. Estimating the quality of a video stream thus entails determining the set of reference patterns that includes the most reference patterns identified in the frame size sequence generated for that stream. Estimation then includes categorizing the sequence as belonging to the category that is characterized by the determined set of reference patterns, and estimating the user-perceived quality of the stream as a function of an average user-perceived quality associated with that category.

In one or more other embodiments, the reference characteristics that serve as parameters in the reference model comprise reference statistical measures of the generated frame size sequence, rather than or in addition to reference patterns in that sequence. Example reference statistical measures in this regard include the mean of the sequence, the variance of the sequence, the standard deviation of the sequence, the mode of the sequence, the median of the sequence, and the like. Regardless of the particular types of reference statistical measures, estimation processing according to these embodiments entails analyzing the frame size sequence to compute or otherwise identify these measures for the sequence. Processing then includes estimating the quality of the video stream as a function of those measures, according to the reference model.

In this regard, the reference model in one or more embodiments comprises a pre-determined linear regression model that expresses the user-perceived quality of a video stream as a linear combination of two or more reference statistical measures of the frame size sequence generated for that stream. By contrast, the reference model in one or more other embodiments comprises a pre-determined logistic regression model that expresses a category of the sequence as a linear combination of two or more of the identified reference statistical measures of the sequence.

Still other embodiments herein combine the various approaches above. For instance, in one embodiment, the estimation process may entail obtaining a first estimate of a stream's quality based on reference patterns identified in the stream's frame size sequence, and then separately obtaining a second estimate of the stream's quality based on reference statistical measures identified for the stream's sequence. These two separate estimates may then be combined to obtain a final quality estimate for the stream.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
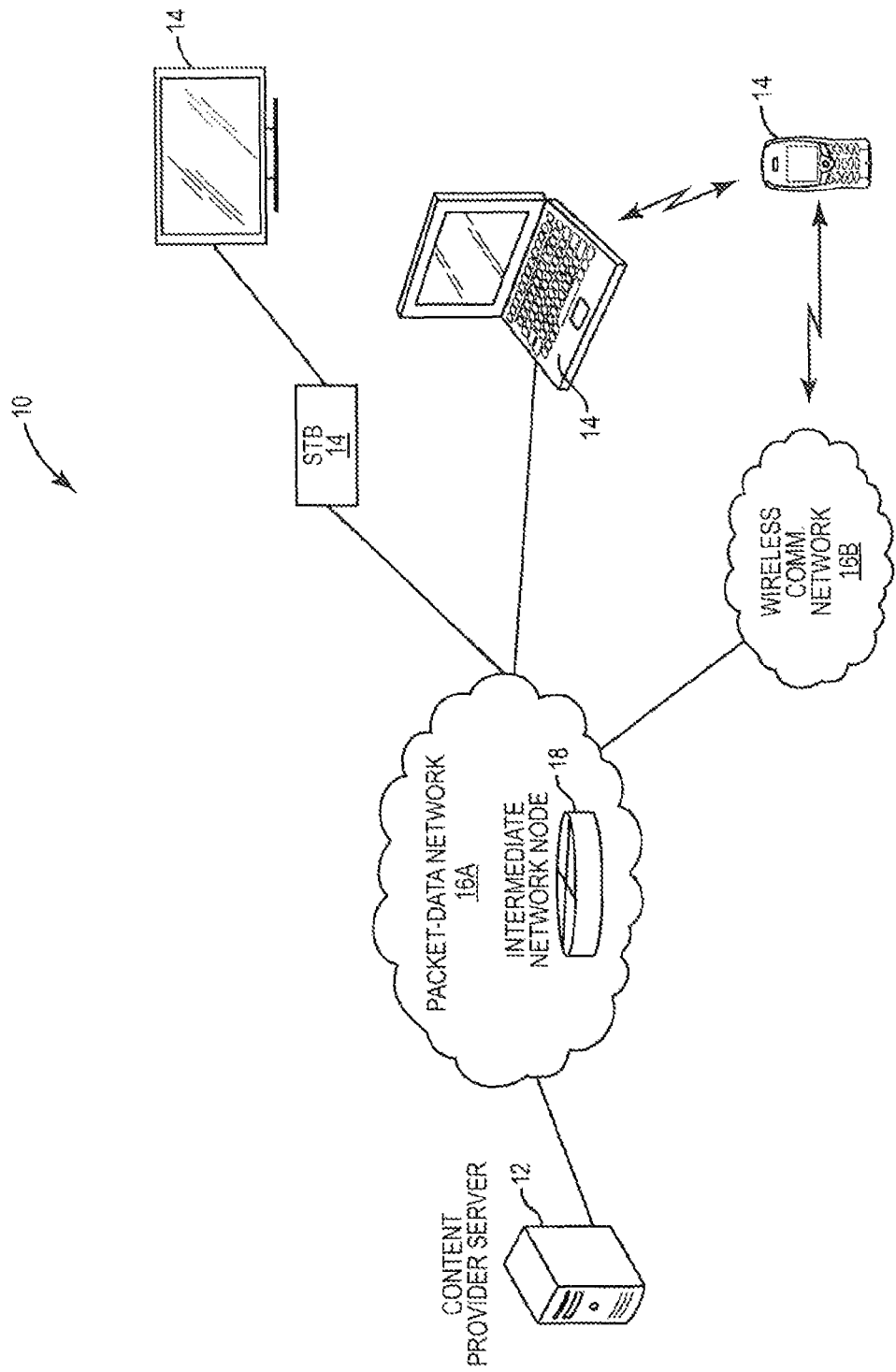
FIG. 1 is a simplified block diagram of a communications network that includes an apparatus configured to objectively estimate user-perceived quality of an encoded video stream according to one or more embodiments.

FIG. 1 depicts a communications system 10 that includes a content provider serve one or more end nodes 14, and one or more delivery networks 16. The content provider server 12 encodes and otherwise prepares a video stream for delivery. The one or more delivery networks 16, which may include for instance a packet-data network 16A, a wireless communications network 16B, or the like, receive the encoded video stream from the content provider server 12 and deliver that stream to the one or more end nodes 14. In connection with the delivery of the encoded video stream, any one of a variety of different physical nodes within the system 10 dynamically and objectively estimates the quality of the stream, as perceived by a user of an end node 14 viewing the stream. This user-perceived quality may be dynamically estimated, for instance, as a Mean Opinion Score (MOS), based on one or more objective factors, rather than based on the actual subjective opinion of the user.

In some embodiments, the physical node estimating this user-perceived quality is one of the end nodes 14 to which the video stream is destined. In this case, the end node 14 may objectively estimate the user-perceived quality in dependence on transmission errors detected upon decoding the encoded video stream, delay in the end-to-end delivery of the stream, or any other objective factors available to the end node 14 that contribute to the quality ultimately perceived by the user of that node 14. Having estimated the user-perceived quality, the node 14 may report the quality as feedback to the content provider server 12, or to the delivery network 16, for in-service quality monitoring.

In other embodiments, the physical node estimating the user-perceived quality is an intermediate network node 18 via which the encoded video stream is relayed to an end node 14. Such an intermediate network node 18 may be included in the packet-data network 16A (as shown in FIG. 1) or any other delivery network 16 serving as an intermediary between the content provider server 12 and an end node 14. Like an end node 14, an intermediate network node 18 may estimate the user-perceived quality in dependence on various objective factors, but those factors are necessarily limited to those related to transmission from the content provider server 12 to the intermediate network node 18, not from the intermediate network node 18 to an end node 14.

Regardless of which physical node in the system 10 estimates the user-perceived quality of the encoded video stream, that node advantageously does so in dependence on the underlying video content of the stream (e.g., in addition to any other factors mentioned above on which the node might base its estimate). But rather than necessarily evaluating the underlying video content directly (e.g., after decoding the stream's video frames), the node estimates the user-perceived quality based on analyzing a chronological sequence of the absolute or relative sizes of the stream's encoded video frames. Notably, this sequence may be generated from an inspection of one or more packet-layer parameters. This means that the node may estimate user-perceived quality based on a stream's underlying video content and thereby improve the accuracy of the quality estimate as compared to estimates not based on video content, even if the video stream payload is encrypted.

Figure 2:
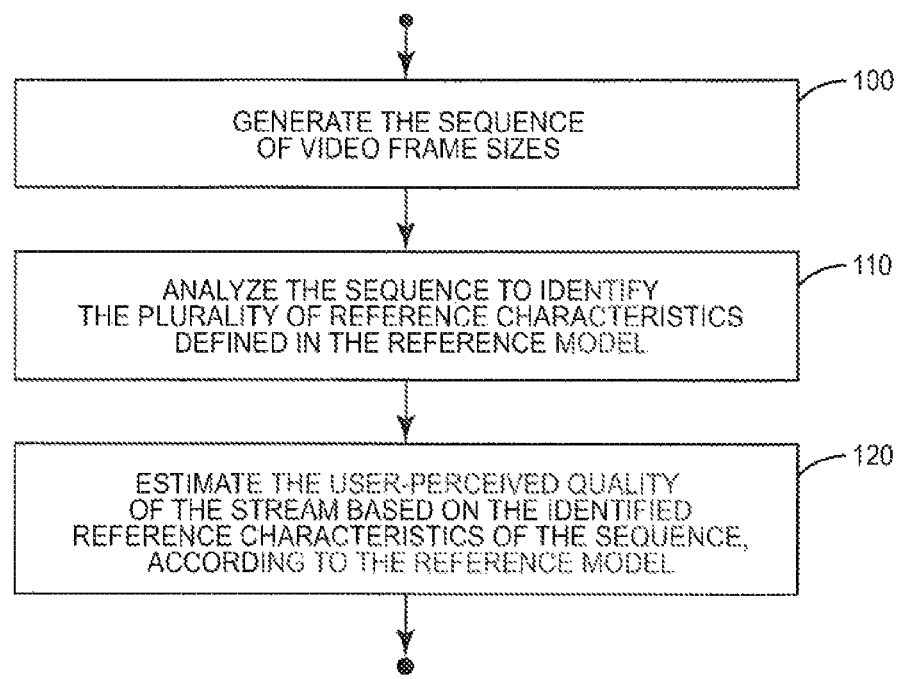
FIG. 2 is a logic flow diagram of a method for objectively estimating user-perceived quality of an encoded video stream according to one or more embodiments.

FIG. 2 illustrates a method for objectively estimating user-perceived quality of an encoded video stream in this regard. As shown in FIG. 2, processing according to this method includes generating a chronological sequence of the absolute or relative sizes of encoded video frames in the stream (Block 100). For convenience, this sequence may be referred to herein simply as a frame size sequence, regardless of whether the sizes represented by the sequence are absolute sizes or relative sizes. Generation of the frame size sequence may entail inspecting one or more packet-layer parameters of the stream to obtain information pertaining to the sizes of the stream's encoded video frames. In such case, the sequence may then be generated based on this size information to describe the relationship over time between the sizes of the stream's frames. In this regard, the sequence may describe the absolute sizes of the stream's frames over time, may describe relative differences in the sizes of the stream's frames, or the like. Such sizes may be expressed in terms of bits, bytes, or any other fundamental unit that directly describes an amount of information.

Processing according to the method then entails analyzing the sequence to identify a plurality of reference characteristics that are defined in a reference model (Block 110). These reference characteristics are more specifically defined in the reference model as parameters that characterize or are otherwise associated with content-dependent variations in user-perceived quality. That is, the reference model models user-perceived quality of a stream as a function of the reference characteristics, and these reference characteristics reflect variations in the modeled quality that are due to the underlying video content of the stream. As described more fully below, reference characteristics herein may comprise reference patterns in the sequence, reference statistical measures of the sequence, or any other such characteristics that are derived from an analysis of the sequence and that are parameters in the reference model for describing content-dependent variations in user-perceived quality. The reference characteristics thereby grossly describe relationships over time between video frames in terms of their size, without specifically distinguishing the frames in terms of their encoded frame type (i.e., I-frame, P-frame, or B-frame).

Regardless, processing of the method finally includes estimating the user-perceived quality of the stream based on the identified reference characteristics, according to the reference model (Block 120). Estimating user-perceived quality in this way, the method advantageously leverages the reference characteristics identified in the frame size sequence as indirect indicators of content-dependent variations in the user-perceived quality of a stream.

As suggested above, the frame size sequence may be advantageously generated based on an inspection of one or more packet-layer parameters. One such parameter may include, for instance, a timestamp parameter, e.g., the timestamp field contained in the RTP (Real-time Transport Protocol) header. More specifically in this regard, each video frame is delivered over the packet-data network 16A within one or more packets. Each packet associated with the same video frame includes an identical timestamp parameter, because each of those packets is to be played out in the video stream at the same time. Thus, generating a chronological sequence of the absolute sizes of video frames may entail inspecting the timestamp parameters of packets and identifying, based on that inspection, which packets have the same timestamps. Generation may then include summing the payload sizes of those packets that have the same timestamps, to obtain the absolute size of any given video frame. Finally, generation may entail arranging or assembling those frame sizes in chronological playout order, as indicated by the identified timestamps.

Of course, the frame size sequence generation process just described has been conceptually generalized in a number of respects, and some embodiments may include one or more variations or modifications to the process for certain types of video frame encoding schemes. Consider, for instance, FIGS. 3A-3B, which help illustrate variations to the generation process for one type of encoding scheme.

Figure 3A:
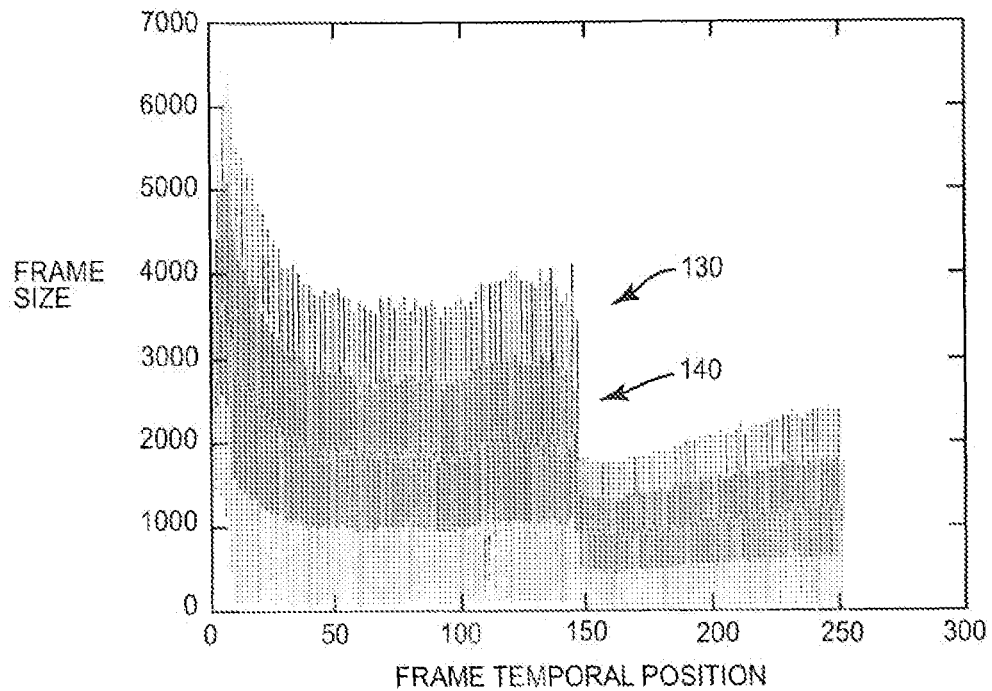
FIGS. 3A-3C are graphical diagrams that illustrate an example of a sequence of video frame sizes generated according to one or more embodiments.

The graph in FIG. 3A plots the absolute sizes (in bits) of video frames that have been encoded according to this encoding scheme. As shown in the graph, the encoding scheme can be considered to effectively produce two different sequences of frame sizes, one sequence 130 from frames with an odd numbered temporal position and another sequence 140 from frames with an even numbered temporal position. Often, the size of each frame in one sequence (e.g., sequence 130) is larger than the size of a similarly positioned frame in the other sequence (e.g., sequence 140), where these frames are considered as being paired with one another.

Because this encoding scheme effectively produces two different sequences of frame sizes, the processing described above for estimating user-perceived quality may exclusively employ either one of these frame size sequences. In this case, the frame size sequence generation process described above may be modified to generate the sequence from every other received video frame, rather than from each received video frame. Note that the sequence is still considered to be a chronological sequence, since the frames are still arranged in the sequence according to their timestamps.

Figure 3B:
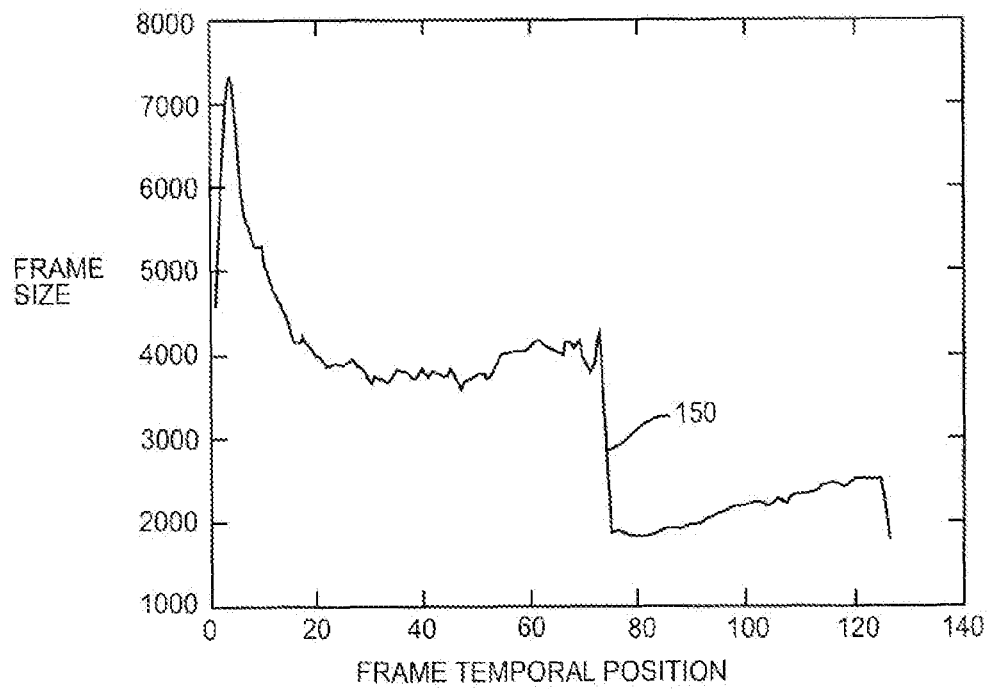

Alternatively, processing for estimating user-perceived quality may employ both of the frame size sequences. In one embodiment, for example, the processing produces separate estimates of user-perceived quality based on each of the frame size sequences and then linearly combines those separate estimates to obtain a final quality estimate. In another embodiment, the processing linearly combines the sequences to generate a combined frame size sequence and then produces a single estimate of user-perceived quality based on that combined sequence. Linearly combining the sequences in this way may entail, for instance, generating a combined sequence from the difference between the sequences (or more specifically from the difference between the sizes of paired frames). Alternatively, the combined sequence may be generated by adding the sequences together (or more specifically by adding together the sizes of paired frames). FIG. 3B illustrates the envelope 150 of a combined sequence generated according to this latter embodiment, with half the sampling rate.

One or more embodiments include still other variations to the frame size sequence generation process. Such embodiments generate a frame size sequence as just described above, but that sequence is referred to as a raw frame size sequence, since this raw sequence is further processed before being analyzed. Processing of the raw sequence may entail, for instance, segmentation and quantization as illustrated in FIG. 3C.

Figure 3C:
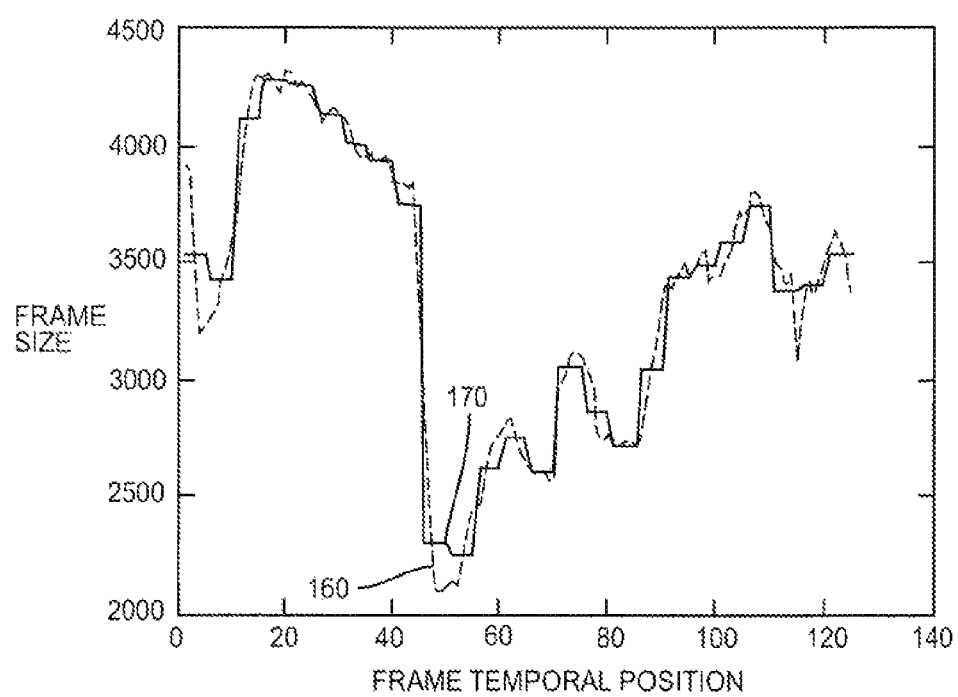

As shown in FIG. 3C, one or more embodiments generate a raw frame size sequence 160 as described above. The embodiments then process this raw sequence 160 to obtain a processed version 170 of the raw sequence 160. Processing of the raw sequence 160 as shown in FIG. 3C includes segmenting the raw sequence 160 into a plurality of segments of approximately equal size. This size may be predefined according to one or more size parameters in order to reduce the dimensionality of the raw sequence 160. Processing then includes computing an average over each of these equally sized segments, and then quantizing the computed averages to obtain the processed version 170 of the raw sequence 160.

Quantization levels in this regard may also be predefined according to one or more parameters. Moreover, these quantization levels may be specified in terms of numerical size values or even arbitrary symbol values (which may even be, for instance, alphabetical letters). Specifying quantization levels in terms of symbol values may be particularly applicable for embodiments described below that employ reference patterns, since such patterns need not be actually represented as numerical patterns.

Regardless of the particular manner in which a frame size sequence is generated, and regardless of whether that sequence is further processed before being analyzed, estimation of user-perceived quality herein is based on analyzing the sequence to identify reference characteristics. These reference characteristics are parameters in a reference model for describing content-dependent variations in user-perceived quality. In one or more embodiments the reference characteristics that serve as parameters in the reference model comprise reference patterns.

Before detailing how identifying such reference patterns in a frame size sequence serve as the basis for estimating the user-perceived quality of a stream, it is helpful to first understand how the reference model is created to include these reference patterns as parameters. Note, however, that the process of actually creating the reference model may be performed by a different physical node than the node that uses the model for estimating user-perceived quality, or by the same node. Thus, at least in this sense, the reference model creation process should be conceptually separated from the estimation process.

Reference model creation according to one or more embodiments employs a plurality of reference video streams. These reference video streams have been identically encoded with the same encoding scheme, the same encoding parameters, and so on, but are known to have different video content. This ensures that any differences in the video frame sizes of the reference streams are attributable to differences in video content, not differences in encoding, and that any differences in the user-perceived qualities of those streams inherently capture content-dependent variations in quality. The reference model creation process thus first includes obtaining such reference streams, as well as obtaining user-perceived qualities of those reference streams that have been previously determined (e.g., empirically or otherwise).

Model creation then includes defining different ranges of user-perceived qualities that will be modeled. The number of ranges to be defined may be specified by a particular input parameter to the model creation process, while the particular qualities collectively covered by the different ranges may depend on the qualities obtained for the reference streams. For example, if the qualities obtained for the reference streams vary between a MOS score of 0 and 5 and an input parameter specifies that the model is to define three ranges of qualities, the model may be created to define one range of qualities between 0 and 1.67, another range of qualities between 1.67 and 3.33, and yet another range of qualities between 3.33 and 5. By comparison, if the qualities obtained for the reference streams vary between a MOS score of 0 and 3 and the input parameter still specifies that the model is to define three ranges of qualities, the model may be created to define one range of qualities between 0 and 1, another range of qualities between 1 and 2, and yet another range of qualities between 2 and 3.

Regardless, once the quality ranges have been defined, model creation includes generating frame size sequences for the reference streams, in a manner analogous to that described above. Model creation then entails analyzing those sequences in order to generally categorize the types of frame size sequences that are characteristic of video streams associated with the different quality ranges. The created reference model thus defines different categories of frame size sequences as being characteristic of video streams that have qualities within different ranges.

The reference model broadly categorizes frame size sequences in this way based on patterns in those sequences. For example, in categorizing the types of frame size sequences that are associated with a particular quality range, the model creation process identifies a set of commonly occurring patterns within the frame size sequences that have been generated for reference streams with qualities known to be within that range. The model creation process then defines the patterns in this set as being so-called reference patterns for the considered category, in order to exploit the reference patterns as being characteristic of frame size sequences that belong to the category.

Broadly, therefore, the reference model defines different categories of frame size sequences as being characterized by different sets of reference patterns, and as being associated with different ranges of user-perceived qualities. For each category, model creation populates the set of reference patterns that is to characterize that category by evaluating the reference streams that have a quality within the quality range of the category. Such evaluation entails generating a frame size sequence for each of those reference streams, and then analyzing those sequences to identify patterns in the sequences. Each of these identified patterns serves as a candidate for being included in the set of reference patterns that characterize the category; that is, each identified pattern serves as a candidate reference pattern. But, only the most commonly identified candidate reference patterns are selected for inclusion in the set of reference patterns for the category.

In this way, reference patterns effectively serve as parameters of the reference model. Indeed, certain reference patterns map to a particular frame size sequence category, and that category in turn maps to a particular quality range.

With this understanding of the reference model creation process, one may better appreciate the process of using the model to estimate the user-perceived quality of a given (i.e. non-reference) video stream. This estimation process specifically entails analyzing the frame size sequence generated from the video stream in order to identify any reference patterns in that sequence. This may involve searching for any of the reference patterns defined in the reference model, without distinguishing between the different reference pattern sets of the model. In any case, estimation processing then includes determining which set of reference patterns includes the most reference patterns identified in the frame size sequence, and categorizing the sequence as belonging to the category that is characterized by the determined set of reference patterns. Finally, processing entails estimating the user-perceived quality of the stream as a function of an average quality associated with the category to which the sequence belongs.

Figures 4A, 4B:
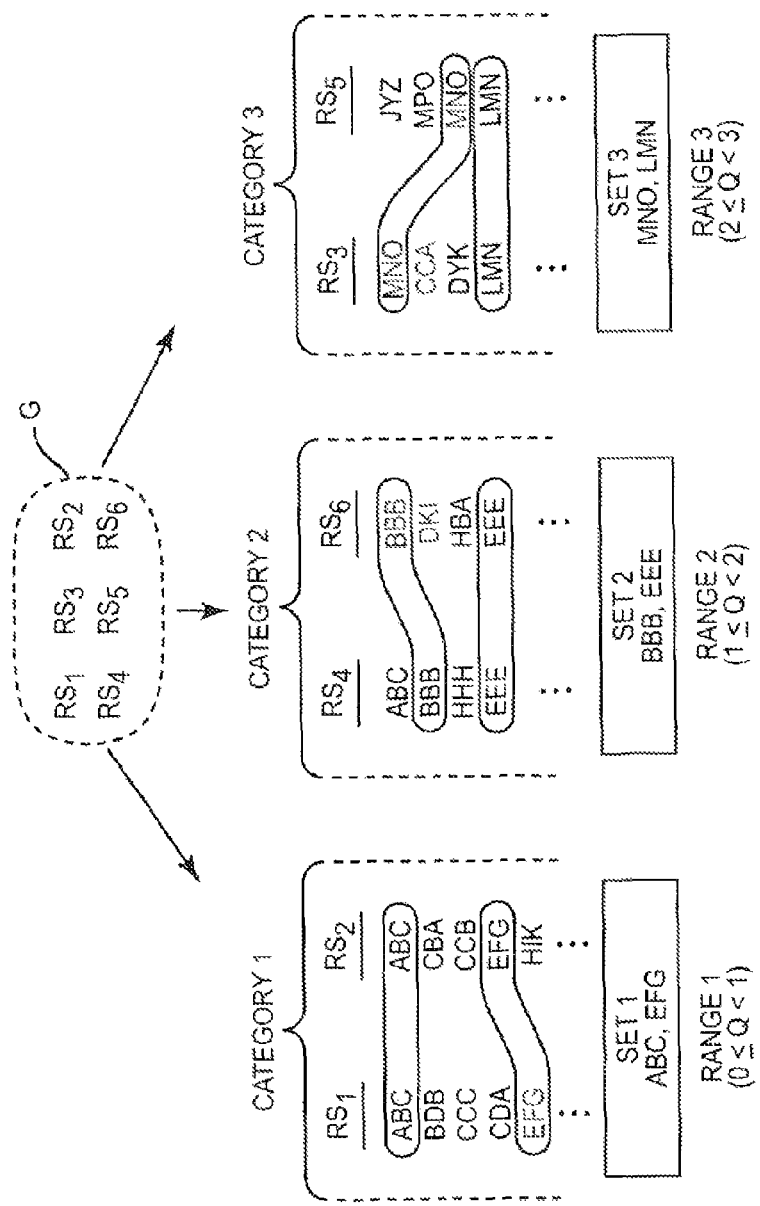
FIGS. 4A-4B illustrate a detailed example of embodiments that utilize reference patterns in a sequence of video frame sizes for estimating user-perceived quality according to one or more embodiments.

FIGS. 4A-4B illustrate a helpful example of both the model creation process and the estimation process according to these embodiments. As shown in FIG. 4A, a node that creates the reference model obtains a group G of reference streams $RS_1 \ldots RS_6$. The node also obtains previously determined user-perceived qualities Q of those streams. In this example, these known qualities Q comprise MOS scores and vary among the streams, with $RS_1$ having a MOS score of 0, $RS_2$ having a MOS score of 0.5, $RS_3$ having a MOS score of 2, $RS_4$ having a MOS score of 2.25, $RS_5$ having a MOS score of 2.5, and $RS_6$ having a MOS score of 1.5. Based on a predefined parameter that specifies 3 quality ranges are to be defined, the node correspondingly defines 3 quality ranges for the model. Range 1 spans MOS scores Q greater than or equal to 0 but less than 1, range 2 spans MOS scores Q greater than or equal to 1 but less than 2, and range 3 spans MOS scores Q greater than or equal to 2 but less than 3.

The node then defines different categories of frame size sequences that are to be associated with the different quality ranges. Consider, for instance, quality range 1. The node defines category 1 to be associated with this quality range 1. In doing so, the node determines a set of reference patterns that is to characterize category 1 (i.e., set 1) by evaluating reference streams $RS_1$ and $RS_2$, since those streams have MOS scores within quality range 1. Such evaluation entails generating a frame size sequence for each of reference streams $RS_1$ and $RS_2$, and then analyzing each sequence to identify patterns in the sequence as candidate reference patterns. The node then selects the most commonly identified candidate reference patterns for inclusion in set 1.

For instance, in this example, each frame size sequence is segmented and quantized with symbol values as described above. Each frame size sequence therefore includes a series of symbol values that are simply represented by alphabetical letters A-Z. As shown, candidate reference patterns that are identified from analysis of the sequence for reference stream $RS_1$ include: ABC, BDB, CCC, CDA, EFG, and so on. Similarly, candidate reference patterns that are identified from analysis of the sequence for reference stream $RS_2$ include: ABC, CBA, CCB, EFG, HIK, and so on. The node correspondingly determines that candidate patterns ABC and EFG have been identified in the sequence for both reference streams $RS_1$ and $RS_2$, and are therefore the most commonly identified candidate reference patterns. The node only selects these candidate patterns ABC and EFG for inclusion in set 1, thereby excluding the other candidate patterns BDB, CCC, CDA, CBA, CCB, HIK, and so on. Thus, the node in this example creates a reference model that defines the first category 1 of frame size sequences as being characterized by the first set 1 of reference patterns ABC and EFG, and as being associated with the first quality range 1 spanning qualities greater than or equal to 0 but less than 1.

In an analogous manner, the node creates a reference model that defines the second category 2 of frame size sequences as being characterized by a second set 2 of reference patterns BBB and EEE, and as being associated with the second quality range 2 spanning qualities greater than or equal to 1 but less than 2. And the reference model similarly defines the third category 3 of frame size sequences as being characterized by a third set 3 of reference patterns MNO and LMN, and as being associated with the third quality range 3 spanning qualities greater than or equal to 2 but less than 3. In this way, reference patterns ABC, EFG, BBB, EEE, MNO, and LMN effectively serve as parameters of the reference model, since those reference patterns map to respective frame size sequence categories 1-3, which in turn map to respective quality ranges 1-3.

Note of course that the model creation process described in FIG. 4A has been simplified in a number of respects for purposes of illustration. For example, while the process in FIG. 4A only identified patterns of a certain length (e.g., 3 symbols), the process may actually identify patterns of multiple different lengths. Moreover, while FIG. 4A did not describe the process as manipulating the different sets of reference patterns in any way, the process may indeed perform such manipulation according to predefined rules. For example, the predefined rules may specify that any given reference pattern cannot be included in multiple different sets of reference patterns (i.e., the reference patterns must be unique across the sets). As another example, the predefined rules may specify that each set must be of equal size, so as to eliminate any bias between sets.

Regardless of these potential modifications to the simple model creation process in FIG. 4A, FIG. 4B illustrates the process of using this reference model to estimate the user-perceived quality of an example video stream. As shown in FIG. 4B, the estimation process includes generating a frame size sequence from the video stream, in the same way that frame size sequences were generated from the reference video streams during model creation. The estimation process then analyzes that sequence to search for and identify any reference patterns defined as parameters in the reference model. In this example, this analysis identifies three different reference patterns, namely reference patterns EFG, MNO, and LMN.

The estimation process next determines that the first set of reference patterns (Set 1) only includes 1 reference pattern (EFG) identified in the sequence, while the third set of reference patterns (Set 3) includes 2 reference patterns (MNO and LMN) identified in the sequence. Having determined that the third set includes the most reference patterns identified in the sequence, the estimation process categorizes the sequence as belonging to Category 3, since that category is characterized by the third set or reference patterns. Finally, the estimation process estimates the user-perceived quality of the example video stream as a function of the average quality associated with Category 3 (which in this example is the average quality of reference streams $RS_3$ and $RS_5$=a 2.25 MOS score). Such may entail, for instance, simply estimating the perceived quality of the stream to be the same as this average, or may include intelligently considering the average as just one factor in an estimation process that also accounts for other variables besides video content (e.g., transmission errors).

In one or more other embodiments, the reference characteristics that serve as parameters in the reference model comprise reference statistical measures of the generated frame size sequence, rather than or in addition to reference patterns in that sequence. These reference statistical measures each comprise a single measure of some statistical attribute of the frame size sequence, computed according to a predetermined function or algorithm.

Example reference statistical measures in this regard include the mean of the sequence, the variance of the sequence, the standard deviation of the sequence, the mode of the sequence, the median of the sequence, and the like. Other reference statistical measurements may include a so-called longest calm period measure (defined as the longest length of period in the sequence where the difference between the sizes of two consecutive video frames is smaller than a defined ratio (e.g., 0.1) of the mean of the sequence), a longest active period measure (defined as the longest length of period where the difference between the sizes of two consecutive frames is greater than a defined ratio (e.g., 0.0025) of the mean of the sequence), a longest small period measure (defined as the longest length of period where the sizes of video frames are smaller than a defined ratio (e.g., 0.9) of the mean of the sequence), and a longest large period measure (defined as the longest length of period where the sizes of video frames are greater than the mean of the sequence). Still other reference statistical measures may include the number of bursts in the sequence (defined as the number of times in the sequence where the difference between the sizes of two consecutive frames is greater than a defined ratio (e.g., 0.045) of the mean of the sequence) and the number of passes through the median of the sequence (defined as the number of times the sequence goes from greater to smaller than the mean of the sequence, or vice versa).

Regardless of the particular types of reference statistical measures, estimation processing according to these embodiments entails analyzing the frame size sequence to compute or otherwise identify these measures for the sequence. Processing then includes estimating the quality of the video stream as a function of those measures, according to the reference model.

In this regard, the reference model in one or more embodiments comprises a pre-determined linear regression model that expresses the user-perceived quality of a video stream as a linear combination of two or more reference statistical measures of the frame size sequence generated for that stream. Creation of this linear regression model may entail, for instance, computing the reference statistical measures for each of a plurality of reference video streams, and performing linear regression analysis on the results with respect to the known user-perceived qualities of those reference streams. The reference statistical measures thereby becomes the predictor (i.e., independent) variables in the linear regression model, while user-perceived quality is the response (i.e., dependent) variable.

As a simple example of this, a linear regression model herein may express user-perceived quality Q of a video stream as:

$$Q = 1.7647 + 0.0003*(ME) - 0.0035*(LC) + \\ 0.0022*(LA) - 0.0017*(LS) + 0.0082*(LL) - 0.0109*(NP), \quad (1)$$

where ME is the median of the stream's frame size sequence, LC is the longest calm period of the sequence, LA is the longest active period of the sequence, LS is the longest small period of the sequence, LL is the longest large period of the sequence, and NP is the number of passes through the median of the frame sequence. In this example, and in general, a linear regression model models user-perceived quality of a stream as increasing with ME, LA, and LL, and as decreasing with LC, LS, and NP. Broadly, at least some of these relationships can be intuitively understood. For instance, in general, long calm periods represented by LC may indicate that video frames are being encoded with the maximum number of available bits, meaning that the encoder likely needs more bits per frame to achieve better quality. The long active periods represented by LA may indicate the converse; namely, that the encoder has enough bits per frame to achieve high quality.

While the above embodiments strictly utilized the reference statistical measures for quality estimation, other embodiments herein also utilize frame size sequence categories (in a manner similar to that described above with respect to the reference patterns). Specifically, these other embodiments recognize that frame size sequences for video streams with different perceived qualities may be categorically distinguished by reference statistical measures computed for those sequences. Thus, instead of or in addition to distinguishing different categories via recognized patterns in frame size sequences, these embodiments distinguish different categories via computed statistical measures for those sequences.

In one embodiment, therefore, the reference model comprises a pre-determined logistic regression model that expresses a category of the sequence as a linear combination of two or more of the identified reference statistical measures of the sequence. Estimation in this case may entail computing a category of the sequence based on the identified reference statistical measures, according to the logistic regression model, and then estimating the user-perceived quality of the stream as a function of the user-perceived quality associated with the computed category of the sequence.

Creation of this logistic regression model may entail, for instance, computing the reference statistical measures for each of a plurality of reference video streams, and performing logistic regression analysis on the results with respect to the known user-perceived qualities of those reference streams. Such analysis may use an ordinal model for fitting, and assume that there is no interaction between different frame size sequence categories. Regardless, the reference statistical measures thereby becomes the predictor (i.e., independent) variables in the logistic regression model, while frame size sequence category is the response (i.e., dependent) variable.

As a simple example of this, a logistic regression model herein may express an intercept value I for a frame size sequence category as:

$$I = -0.0030*(M) - 0.0001*(V) + 0.0040*(S) - 0.0010*(MO) + \\ 0.0166*(LC) - 0.0119*(LA) - 0.0422*(LS) - 0.0350*(NP), \quad (2)$$

where M is the mean of the sequence, V is the variance of the sequence, S is the standard deviation of the sequence, MO is the mode of the sequence, LC is the longest calm period of the sequence, LA is the longest active period of the sequence, LS is the longest small period of the sequence, and NP is the number of passes through the median of the sequence. Intercept values for the different categories may correspondingly be [1.7580, 2.9797, 4.0756, 5.3036].

Those skilled in the art will of course appreciate that, while various embodiments were described above separately from one another, those embodiments may be utilized in combination. For example, the reference model used for quality estimation may define both reference patterns and reference statistical measures as parameters. In this case, the estimation process may entail obtaining a first estimate of a stream's quality based on reference patterns identified in the stream's frame size sequence, and then separately obtaining a second estimate of the stream's quality based on reference statistical measures identified for the stream's sequence. These two separate estimates may then be combined to obtain a final quality estimate for the stream.

Figure 5:
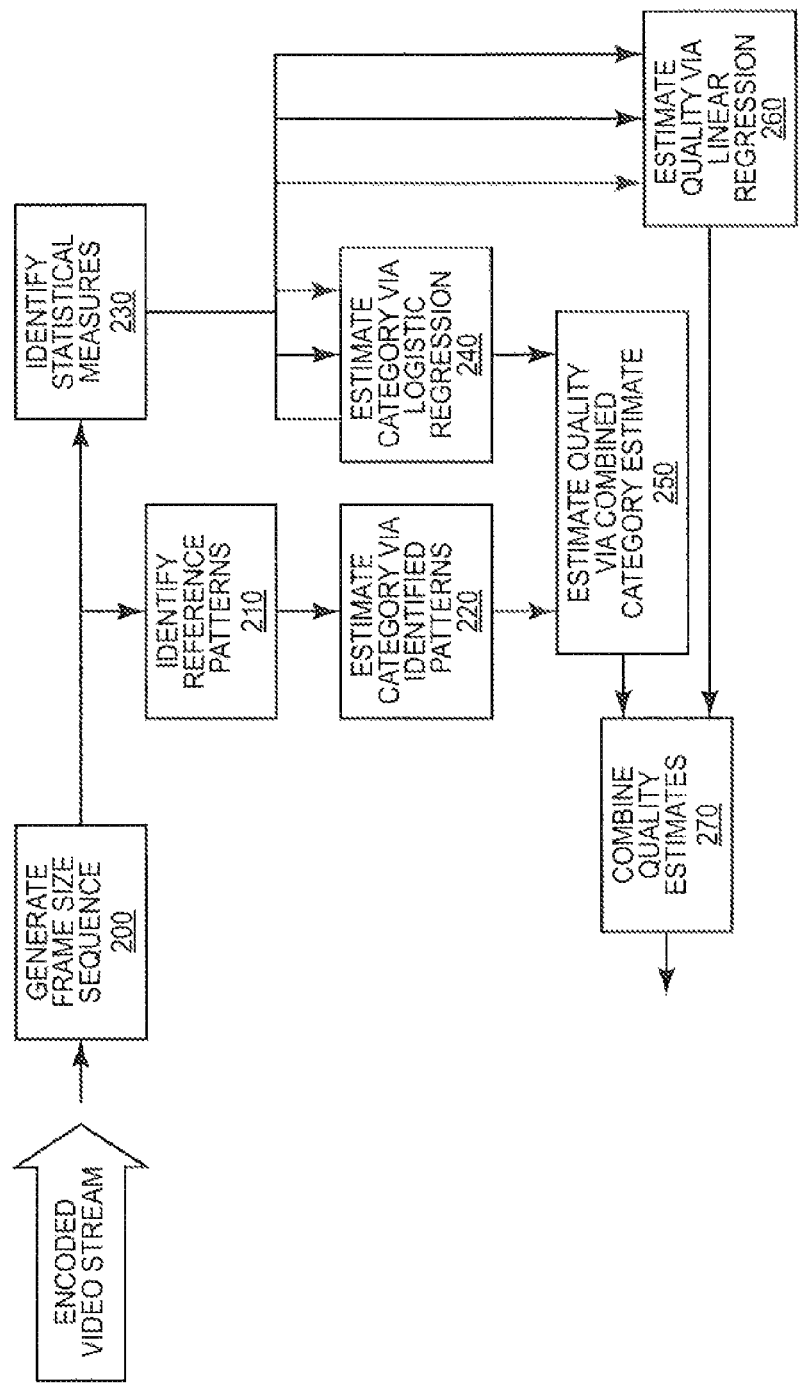
FIG. 5 is a logic flow diagram of a method for objectively estimating user-perceived quality of an encoded video stream based on both reference patterns in the stream and reference statistical measures of the stream, according to one or more embodiments.

In one particular example of these embodiments shown in FIG. 5, the first quality estimate is computed based on both reference patterns and reference statistical measures, while the second quality estimate is computed solely based on the reference statistical measures. More specifically, estimation processing as depicted in FIG. 5 includes generating a frame size sequence for the stream (Block 200). Processing then includes identifying reference patterns in the sequence (Block 210) as well as identifying the reference statistical measures for the sequence (Block 230). Processing further includes determining separate estimates of a category to which the stream's frame size sequence belongs based respectively on the identified reference patterns in the sequence (Block 220) and on two or more of the identified reference statistical measures of the sequence (e.g., via logistic regression as shown in Block 240). Next, processing includes combining the separate category estimates to obtain a combined category estimate and then obtaining the first quality estimate as a function of the quality associated with the combined category estimate (Block 250). Meanwhile, the second quality estimate is computed based solely on the reference statistical measures, e.g., via linear regression (Block 260). Finally, the first and second quality estimates are combined (e.g., averaged together) to obtain the final quality estimate (Block 260).

Those skilled in the art will also appreciate other combinations of the above embodiments for quality estimation. As one more example, while the above embodiments were largely described with respect to a single frame size sequence, other embodiments may implement estimation processing for multiple frame size sequences and then combine the resulting quality estimates to obtain a final quality estimate. For instance, rather than generating a single sequence of either absolute frame sizes or relative frame sizes, estimation processing may include generating first and second frame size sequences that respectively comprise a sequence of absolute frame sizes and a sequence of relative frame sizes. These frame size sequences may be analyzed separately to obtain separate quality estimates for the stream, which are then combined to produce a final estimate. Of course, the model creation process may be correspondingly adjusted to model user-perceived quality with respect to multiple different types of frame size sequences.

Further in this regard, though, those skilled in the art will appreciate that the reference model may actually model user-perceived quality differently for different video stream bitrates. Such may entail for instance defining different reference patterns for different bitrates, different linear or logistic regression expressions (e.g., coefficients) for different bitrates, or the like. The graph in FIG. 6 illustrates these embodiments while also demonstrating the advantages achieved herein by estimating user-perceived quality in dependence on video content.

Figure 6:
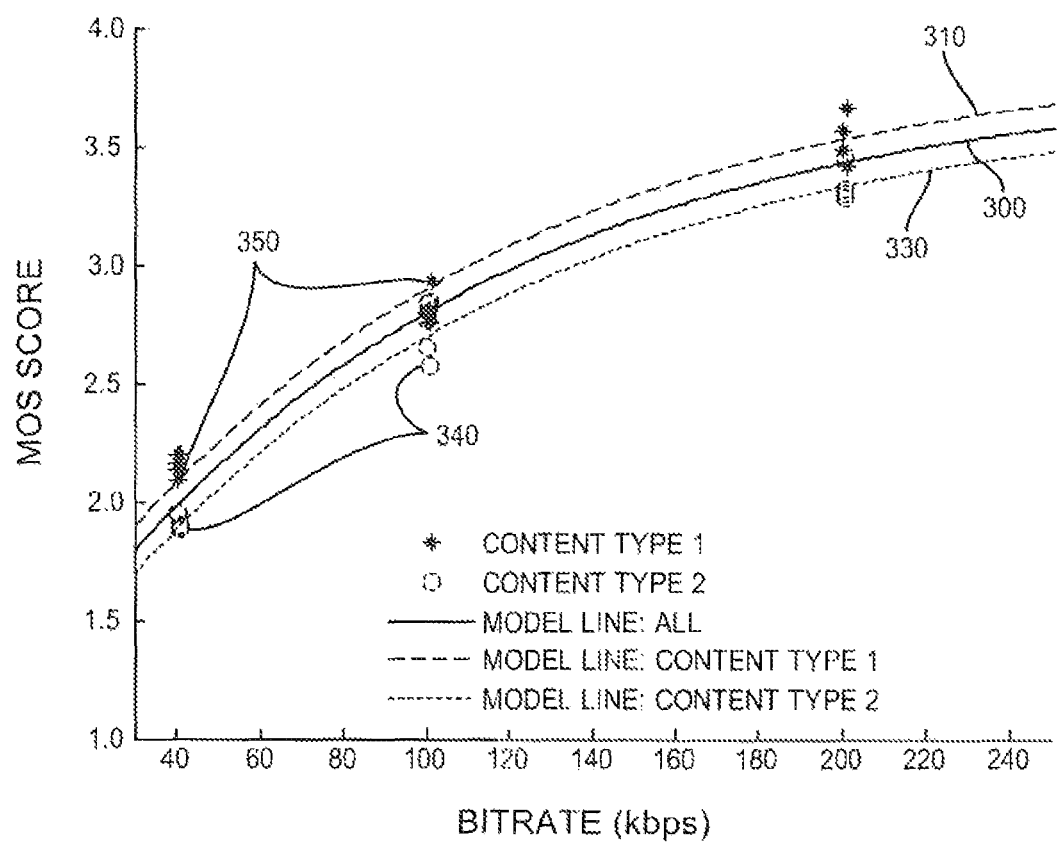
FIG. 6 is a graphical diagram that quantitatively illustrates advantageous results that are achieved in terms of improved quality estimation, according to one or more embodiments.

As shown in FIG. 6, MOS scores for a video stream vary as a function of the stream's bitrate. As shown by line 300, known approaches to objectively estimating MOS scores based on packet-layer parameters model two different video streams with different video content as having the same MOS scores as a function of bitrate, simply because they are identically encoded. By contrast, lines 310 and 330 illustrate that embodiments herein model those two video streams as having different MOS scores as a function of bitrate, because they have different video content. Modeling MOS scores in this way indeed proves advantageous, as the model produces MOS score estimates that are closer to the actual MOS scores 340 and 350 for those streams (e.g., by as much as a half a MOS).

Figure 7:
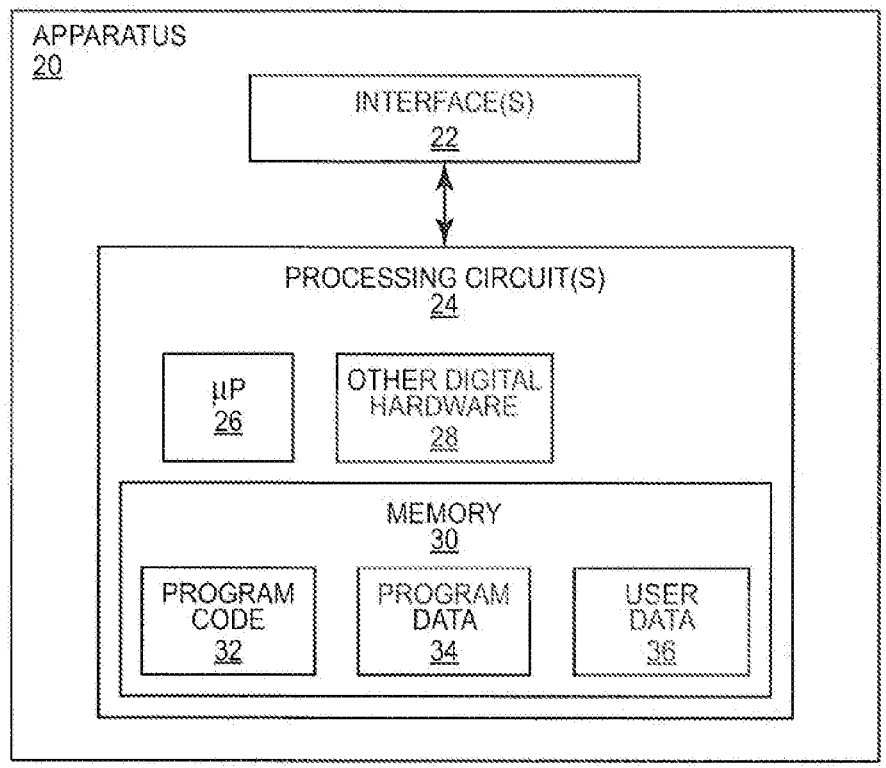
FIG. 7 is a block diagram of an apparatus configured to objectively estimate user-perceived quality of an encoded video stream according to one or more embodiments.

An apparatus configured to carry out the techniques described above is illustrated in FIG. 7. This apparatus 20 may be, for instance, an end node 14 that receives the video stream or may be an intermediate network node 18. Regardless, the apparatus 20 includes one or more interfaces 22 and one or more processing circuits 24. The one or more interfaces 22 use known signal processing techniques, typically according to one or more communication standards, for communicatively coupling the apparatus 20 to the content provider server 12 (directly or indirectly via other nodes) for receiving the video stream. The one or more interfaces 22 may also be configured to format digital data and condition a communication signal, from that data, for transmission over a communications link.

The one or more processing circuits 24 are configured to extract digital data from the one or more interfaces 22 for processing, and to generate digital data for transmission over the one or more interfaces 22. More particularly, the one or more processing circuits 24 comprise one or several microprocessors 26, digital signal processors, and the like, as well as other digital hardware 28 and memory circuit 30. Memory 30, which may comprise one or several types of memory such as read-only memory (ROM), random-access memory, cache memory, flash memory devices, optical storage devices, etc., stores program code 32 for executing one or more data communications protocols and for carrying out one or more of the techniques described herein. Memory 30 further stores program data 34 and user data 36 for carrying out such techniques, and also stores various parameters and/or other program data for controlling the operation of the apparatus 20.

Figure 8:
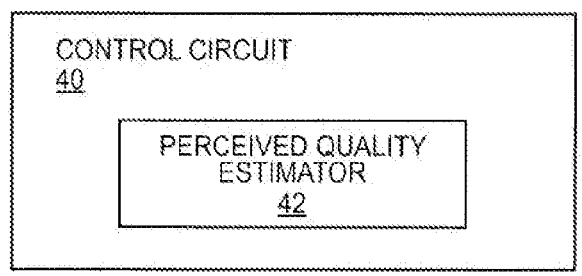
FIG. 8 is a block diagram of a control circuit in an apparatus configured to objectively estimate user-perceived quality of an encoded video stream according to one or more embodiments.

Of course, not all of the steps of the techniques described herein are necessarily performed in a single microprocessor or even in a single module. Thus, FIG. 8 presents a more generalized view of a control circuit 40 configured to carry out the method shown in FIG. 2. This control circuit 40 may have a physical configuration that corresponds directly to processing circuits 24, for example, or may be embodied in two or more modules or units. In either case, the control circuit 40 includes one or more modules or sub-circuits to carry out operations in accordance with the method in FIG. 2. These one or more units are pictured in FIG. 8 as a perceived quality estimator 42.

The perceived quality estimator 42 is configured to generate a chronological sequence of the absolute or relative sizes of encoded video frames in a received video stream. The estimator 42 is then configured to analyze that sequence to identify a plurality of reference characteristics that are defined in a reference model as parameters associated with content-dependent variations in user-perceived quality. Finally, the estimator 42 is configured to estimate the user-perceived quality of the stream based on the identified reference characteristics, according to the reference model.

Those skilled in the art will appreciate that no particular communication technology is required for delivery of the video stream. Indeed, while various embodiments herein suggested that the RTP protocol is used for packet-based delivery of the video stream and that RTP packet parameters are used for frame size sequence generation, other embodiments may utilize different protocols. Other protocols in this regard may include the IP protocol or the MPEG2TS transport protocol.

Further, as suggested above, the techniques herein may be implemented in any one of a number of different physical nodes in the system 10. If implemented in an end node 14, the techniques can be implemented at the hardware level or the software level (as an API in the OS), with or without standardization. Another case could be that video player programmers include the techniques in their decoders/depacketizers. But this might be unnecessary since the decoder would then have access to the decoded and decrypted payload, which could be used to directly account for content-dependent quality variations. Updating the reference model can be done in an OS update, software update, or the like. By contrast, if implemented in an intermediate network node 18, that node 18 can report quality estimates back to a media gateway/PM node (not shown), where the network owner/media content provider has some aggregation for performance monitoring. Of course privacy concerns and who has rights to the data must be handled, but this should be taken care of in the different standardization forums.

Those skilled in the art will thus recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method for objectively estimating user-perceived quality of an encoded video stream in dependence on the video content of the stream, comprising:
generating a sequence of size values, the size values being the absolute or relative sizes of encoded video frames in the stream, the sequence being in chronological order corresponding to the video frames;
analyzing the sequence of size values, prior to or without decoding payloads of the encoded video frames, to determine, based on the size values, parameters associated with content-dependent variations in user-perceived quality; and
searching a reference model in order to identify a reference dataset corresponding to the parameters determined by analyzing the sequence of video sizes, the reference model comprising a plurality of reference datasets corresponding to a plurality of user-perceived quality levels;
estimating the user-perceived quality of the stream based on a user-perceived quality level corresponding to the reference dataset identified within the reference model.

2. The method of claim 1, wherein said analyzing comprises analyzing the sequence to identify a plurality of reference patterns in the sequence.

3. The method of claim 2, wherein the reference model defines different categories of sequences as comprising different reference datasets and as being associated with different ranges of user-perceived qualities, and wherein said estimating comprises:
determining the reference dataset that includes the most reference patterns identified in the sequence;
categorizing the sequence as belonging to the category comprising the determined reference dataset; and
estimating the user-perceived quality of the stream as a function of an average user-erceived quality associated with the category to which the sequence belongs.

4. The method of claim 3, further comprising creating the reference model by:
obtaining a plurality of reference streams that are identically encoded but that have different video content;
obtaining the plurality of user-perceived quality levels, wherein the plurality of user-perceived quality levels were previously determined for the reference streams; and
for each category of sequences, populating the reference datasets that are to characterize that category by evaluating the reference streams that have a user-perceived quality within the quality range of the category, by:
generating, for each of the reference streams having user-perceived quality within the quality range of the category, a sequence of reference size values, the reference size values being the absolute or relative sizes of encoded video frames in the corresponding reference stream;
analyzing the sequences generated for the reference streams to identify patterns in the sequences as candidate reference patterns; and
selecting the most commonly identified candidate reference patterns for inclusion in the reference datasets.

5. The method of claim 1, wherein said analyzing comprises analyzing the sequence to identify a plurality of reference statistical measures of the sequence.

6. The method of claim 5, wherein said reference model includes a pre-determined linear regression model that expresses the user-perceived quality of the stream as a linear combination of two or more of the identified reference statistical measures of the sequence.

7. The method of claim 5, wherein said reference model includes a pre-determined logistic regression model that expresses a category of the sequence as a linear combination of two or more of the identified reference statistical measures of the sequence.

8. The method of claim 7, wherein said estimating comprises:
computing a category of the sequence based on the identified reference statistical measures, according to the logistic regression model, where different categories of sequences are associated with different user-perceived qualities; and
estimating the user-perceived quality of the stream as a function of the user-perceived quality associated with the computed category of the sequence.

9. The method of claim 1, wherein said analyzing comprises analyzing the sequence to identify a plurality of reference patterns in the sequence, and to identify a plurality of reference statistical measures of the sequence, and wherein said estimating comprises separately obtaining first and second estimates of the user-perceived quality of the stream based respectively on the identified reference patterns in the sequence and on two or more of the identified reference statistical measures of the sequence, and combining the first and second estimates to obtain a combined quality estimate of the stream.

10. The method of claim 9, wherein the reference model defines different categories of sequences as being associated with different user-perceived qualities, and wherein obtaining said first estimate comprises:
determining separate estimates of a category to which the sequence belongs based respectively on the identified reference patterns in the sequence and on two or more of the identified reference statistical measures of the sequence;
combining the separate category estimates to obtain a combined category estimate; and
obtaining said first estimate as a function of the user-perceived quality associated with the combined category estimate.

11. The method of claim 1:
wherein the sequence of size values is a first sequence comprising absolute sizes;
wherein the method further comprises generating a second sequence, the second sequence comprising relative size values that correspond to the relative sizes of the encoded video frames in the stream, the second sequence being in chronological order corresponding to the video frames;
wherein the analyzing and estimating are performed for each of the first and second sequence; and
wherein the method further comprises combining estimates of the user-perceived quality obtained based on the first and second sequences.

12. The method of claim 1, further comprising processing a generated sequence by computing an average over each of a plurality of approximately equally sized segments of that sequence and quantizing the computed averages to obtain a processed version of the sequence, and wherein analyzing that sequence comprises analyzing the processed version of the sequence.

13. An apparatus configured to objectively estimate user-perceived quality of an encoded video stream in dependence on the video content of the stream, wherein the apparatus comprises one or more interfaces configured to receive the stream and one or more processing circuits configured to:
generate a sequence of size values, the size values being the absolute or relative sizes of encoded video frames in the stream, the sequence being in chronological order corresponding to the video frames;
analyze the sequence of size values, prior to or without decoding payloads of the encoded video frames, to determine, based on the size values, parameters associated with content-dependent variations in user-perceived quality; and
search a reference model in order to identify a reference dataset corresponding to the parameters determined by analyzing the sequence of video sizes, the reference model comprising a plurality of reference datasets corresponding to a plurality of user-perceived quality levels;
estimate the user-perceived quality of the stream based on a user-perceived quality level corresponding to the reference dataset identified within the reference model.

14. The apparatus of claim 13, wherein the one or more processing circuits are configured to analyze the sequence to identify a plurality of reference patterns in the sequence.

15. The apparatus of claim 14, wherein the reference model defines different categories of sequences as comprising different reference datasets and as being associated with different ranges of user-perceived qualities, and wherein the one or more processing circuits are configured to estimate the user-perceived quality of the stream by:
determining the reference dataset that includes the most reference patterns identified in the sequence;
categorizing the sequence as belonging to the category comprising the determined reference dataset; and
estimating the user-perceived quality of the stream as a function of an average user-perceived quality associated with the category to which the sequence belongs.

16. The apparatus of claim 15, wherein the one or more processing circuits are further configured to create the reference model by:
obtaining a plurality of reference streams that are identically encoded but that have different video content;
obtaining the plurality of user-perceived quality levels, wherein the plurality of user-perceived quality levels were previously determined for the reference streams; and
for each category of sequences, populating the reference datasets that are to characterize that category by evaluating the reference streams that have a user-perceived quality within the quality range of the category, by:
generating, for each of the reference streams having user-perceived quality within the quality range of the category, a sequence of reference size valus, the reference size values being the absolute or relative sizes of encoded video frames in the corresponding reference stream;
analyzing the sequences generated for the reference streams to identify patterns in the sequences as candidate reference patterns; and
selecting the most commonly identified candidate reference patterns for inclusion in the reference datasets.

17. The apparatus of claim 13, wherein the one or more processing circuits are configured to analyze the sequence to identify a plurality of reference statistical measures of the sequence.

18. The apparatus of claim 17, wherein said reference model includes a pre-determined linear regression model that expresses the user-perceived quality of the stream as a linear combination of two or more of the identified reference statistical measures of the sequence.

19. The apparatus of claim 17, wherein said reference model includes a pre-determined logistic regression model that expresses a category of the sequence as a linear combination of two or more of the identified reference statistical measures of the sequence.

20. The apparatus of claim 19, wherein the one or more processing circuits are configured to estimate the user-perceived quality of the stream by:
computing a category of the sequence based on the identified reference statistical measures, according to the logistic regression model, where different categories of sequences are associated with different user-perceived qualities; and
estimating the user-perceived quality of the stream as a function of the user-perceived quality associated with the computed category of the sequence.

21. The apparatus of claim 13, wherein the one or more processing circuits are configured to analyze the sequence to identify a plurality of reference patterns in the sequence, and to identify a plurality of reference statistical measures of the sequence, and are configured to estimate the user-perceived quality of the stream by separately obtaining first and second estimates of the user-perceived quality of the stream based respectively on the identified reference patterns in the sequence and on two or more of the identified reference statistical measures of the sequence, and combining the first and second estimates to obtain a combined quality estimate of the stream.

22. The apparatus of claim 21, wherein the reference model defines different categories of sequences as being associated with different user-perceived qualities, and wherein one or more processing circuits are configured to obtain said first estimate by:
determining separate estimates of a category to which the sequence belongs based respectively on the identified reference patterns in the sequence and on two or more of the identified reference statistical measures of the sequence;
combining the separate category estimates to obtain a combined category estimate; and
obtaining said first estimate as a function of the user-perceived quality associated with the combined category estimate.

23. The apparatus of claim 13:
wherein the sequence of size values is a first sequence comprising absolute sizes;
wherein the one or more processing circuits are further configured to:
generate a second sequence, the second sequence comprising relative size values that correspond to the relative sizes of the encoded video frames in the stream, the second sequence being in chronological order corresponding to the video frames;
perform the analysis and estimation for each of the first and second sequences; and
combine estimates of the user-perceived quality obtained based on the first and second sequences.

24. The apparatus of claim 13, wherein the one or more processing circuits are further configured to process a generated sequence by computing an average over each of a plurality of approximately equally sized segments of that sequence and quantizing the computed averages to obtain a processed version of the sequence, and wherein the one or more processing circuits are configured to analyze that sequence by analyzing the processed version of the sequence.

* * * * *